United States Patent
Kang et al.

(10) Patent No.: US 11,068,185 B2
(45) Date of Patent: Jul. 20, 2021

(54) ELECTRONIC DEVICE AND TETHERING METHOD THEREOF

(71) Applicant: Samsung Electronics Co., Ltd., Gyeonggi-do (KR)

(72) Inventors: Hyuk Kang, Hwaseong-si (KR); Youngjin Park, Suwon-si (KR); Wookwang Lee, Suwon-si (KR); Minjung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 15/938,604

(22) Filed: Mar. 28, 2018

(65) Prior Publication Data
US 2018/0285017 A1 Oct. 4, 2018

(30) Foreign Application Priority Data

Mar. 29, 2017 (KR) ........................ 10-2017-0039968

(51) Int. Cl.
*G06F 3/06* (2006.01)
*G06F 12/10* (2016.01)
(Continued)

(52) U.S. Cl.
CPC .......... *G06F 3/0647* (2013.01); *G06F 3/0613* (2013.01); *G06F 3/0683* (2013.01);
(Continued)

(58) Field of Classification Search
CPC . G06F 13/00; G06F 9/50; G06F 12/10; G06F 12/1441; G06F 13/1668; G06F 2212/1024; G06F 2212/1052; G06F 2212/657; G06F 2213/0042; G06F 3/0613; G06F 3/0671; G06F 3/0673;
(Continued)

(56) References Cited

U.S. PATENT DOCUMENTS 8,286,188 B1 10/2012 Brief
8,638,790 B2 1/2014 Mir et al.
(Continued)

OTHER PUBLICATIONS

Office Action dated May 20, 2021 in connection with Korean Patent Application No. 10-2017-0039968, 12 pages.

*Primary Examiner* — Idriss N Alrobaye
*Assistant Examiner* — Richard B Franklin

(57) ABSTRACT

An electronic device and a tethering method are disclosed. The electronic device includes a housing, and a display exposed through a first portion of the housing. The electronic device also includes an electrical connector exposed through a second portion of the housing, and a wireless communication circuit. The electronic device further includes a first processor operably coupled to the display and the electrical connector and configured to use a first memory address region including a first plurality of addresses. The electronic device also includes a second processor operably coupled to the wireless communication circuit and configured to use a second memory address region including a second plurality of virtual addresses. The electronic device also include an electric circuitry operably coupled to the first processor and the second processor and configured to provide relations between the first plurality of addresses and the second plurality of virtual addresses.

18 Claims, 12 Drawing Sheets

(51) Int. Cl.
  *G06F 13/16* (2006.01)
  *G06F 9/50* (2006.01)
  *G06F 12/14* (2006.01)
  *G06F 13/42* (2006.01)
  *H04B 1/3827* (2015.01)
  *H04L 12/879* (2013.01)

(52) U.S. Cl.
  CPC ............... *G06F 9/50* (2013.01); *G06F 12/10* (2013.01); *G06F 12/1441* (2013.01); *G06F 13/1668* (2013.01); *G06F 13/4282* (2013.01); *G06F 2212/1024* (2013.01); *G06F 2212/1052* (2013.01); *G06F 2212/174* (2013.01); *G06F 2212/657* (2013.01); *G06F 2213/0038* (2013.01); *G06F 2213/0042* (2013.01); *H04B 1/3827* (2013.01); *H04L 49/901* (2013.01); *Y02D 10/00* (2018.01)

(58) Field of Classification Search
  CPC .... G06F 3/0656; G06F 3/0647; G06F 3/0683; G06F 13/4282; G06F 2213/0038; H04L 12/66; H04L 49/901; H04W 52/0235; H04W 52/0209; H04B 1/3827
  See application file for complete search history.

(56) References Cited

U.S. PATENT DOCUMENTS 10,004,038 B2 * 6/2018 Huang ............... H04W 52/0235
2011/0041127 A1 2/2011 Kohlenz et al.

\* cited by examiner

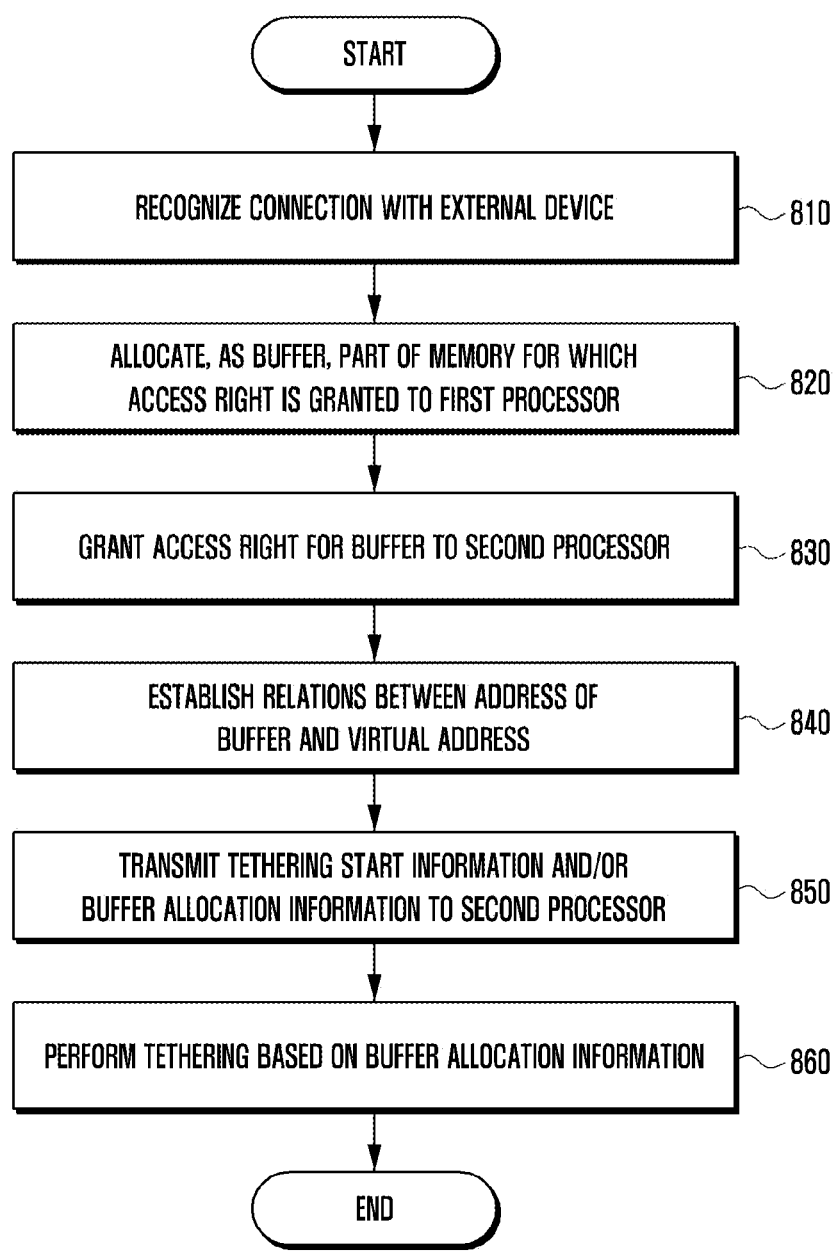

ELECTRONIC DEVICE AND TETHERING METHOD THEREOF

CROSS-REFERENCE TO RELATED APPLICATION(S)

This application is related to and claims priority to Korean Patent Application No. 10-2017-0039968 filed Mar. 29, 2017, the entire disclosure of which is hereby incorporated by reference.

TECHNICAL FIELD

This disclosure relates to an inter processor communication (IPC) of an electronic device for improving a speed of tethering.

BACKGROUND

Tethering is a technology by which one (namely, a mobile device capable of Internet access, e.g., a USB device) of two devices connected to each other via an interface (e.g., a connector) enables the other (namely, an external device, e.g., a USB host) to access the Internet. At this time, an Internet accessible mobile device acts as a modem of an external device.

Tethering (e.g., USB tethering) between a mobile device and an external device is performed as follows. When a mobile device and an external device are connected via an interface (e.g., a wired or wireless interface), the first processor of the mobile device may establish a data connection path between both devices, and then allocate a data transmission and reception buffer in a memory (e.g., a memory of the first processor). In case of data upload, data (e.g., USB data) received from an external device by a mobile device may first be stored in a buffer (e.g., a USB reception buffer). The stored data may be converted (i.e., packetized) into transmission control protocol/internet protocol (TCP/IP) data, and an IP address of the TCP/IP data may be translated through a network address translation (NAT) process. The IP address-translated TCP/IP data may be copied to a shared memory region of the first processor (e.g., an application processor (AP)) and the second processor (e.g., a communication processor (CP)), then also copied to a memory of the second processor, and transmitted to a network.

Such typical tethering uses a large number of resources of a main processor (i.e., the first processor), and in particular, the overhead in the copying process using the shared memory region is large. This may lead to problems such as increased delay, reduced throughput, power consumption due to the use of the main processor, and increased heat generation. For example, the 5G mobile communication network aims at 2 to 3 Gbps, whereas a communication speed between processors in a mobile device may cause a decrease in the overall communication speed.

SUMMARY

To address the above-discussed deficiencies, it is a primary object to improve the performance of tethering by simplifying a complicated process of tethering.

According to various embodiments of the present disclosure, an electronic device may comprise a housing; a display exposed through a first portion of the housing; an electrical connector exposed through a second portion of the housing and including a plurality of electrical contacts; a wireless communication circuit; a first processor electrically connected to the display and the connector and configured to use a first memory address region having a first plurality of addresses; a second processor electrically connected to the wireless communication circuit and configured to use a second memory address region having a second plurality of virtual addresses; and an electric circuitry electrically connected to the first processor and the second processor and configured to provide relations between the first plurality of addresses and the second plurality of virtual addresses.

According to various embodiments of the present disclosure, an electronic device may comprise a housing; a display exposed through a first portion of the housing; an electrical connector exposed through a second portion of the housing and including a plurality of electrical contacts; a wireless communication circuit; an application processor electrically connected to the display and the connector and configured to use a first memory address region having a first plurality of addresses; a communication processor electrically connected to the wireless communication circuit and configured to receive information about the first plurality of addresses and to access data in the first memory address region by using at least a part of the received information; and an electric circuitry electrically connected to the application processor and the communication processor and configured to permit the communication processor to access the first memory address region.

According to various embodiments of the present disclosure, a tethering method of an electronic device may comprise allocating, as a buffer for communication with an external device, a part of a first memory region for which an access right is granted to a first processor among a plurality of processors of the electronic device, when connection between the external device and the electronic device is recognized; and permitting a second processor among the plurality of processors to access the buffer, wherein the second processor reads data written in the buffer and transmits the read data to a network, or receives data from the network and writes the received data in the buffer.

Various embodiments of the present disclosure may provide an electronic device capable of simplifying a data processing procedure between processors, increasing a tethering speed, reducing battery power consumption, and improving a heat generation issue.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flow diagram of a tethering method of an electronic device in accordance with embodiments of the present disclosure;

DETAILED DESCRIPTION

Figure 1:
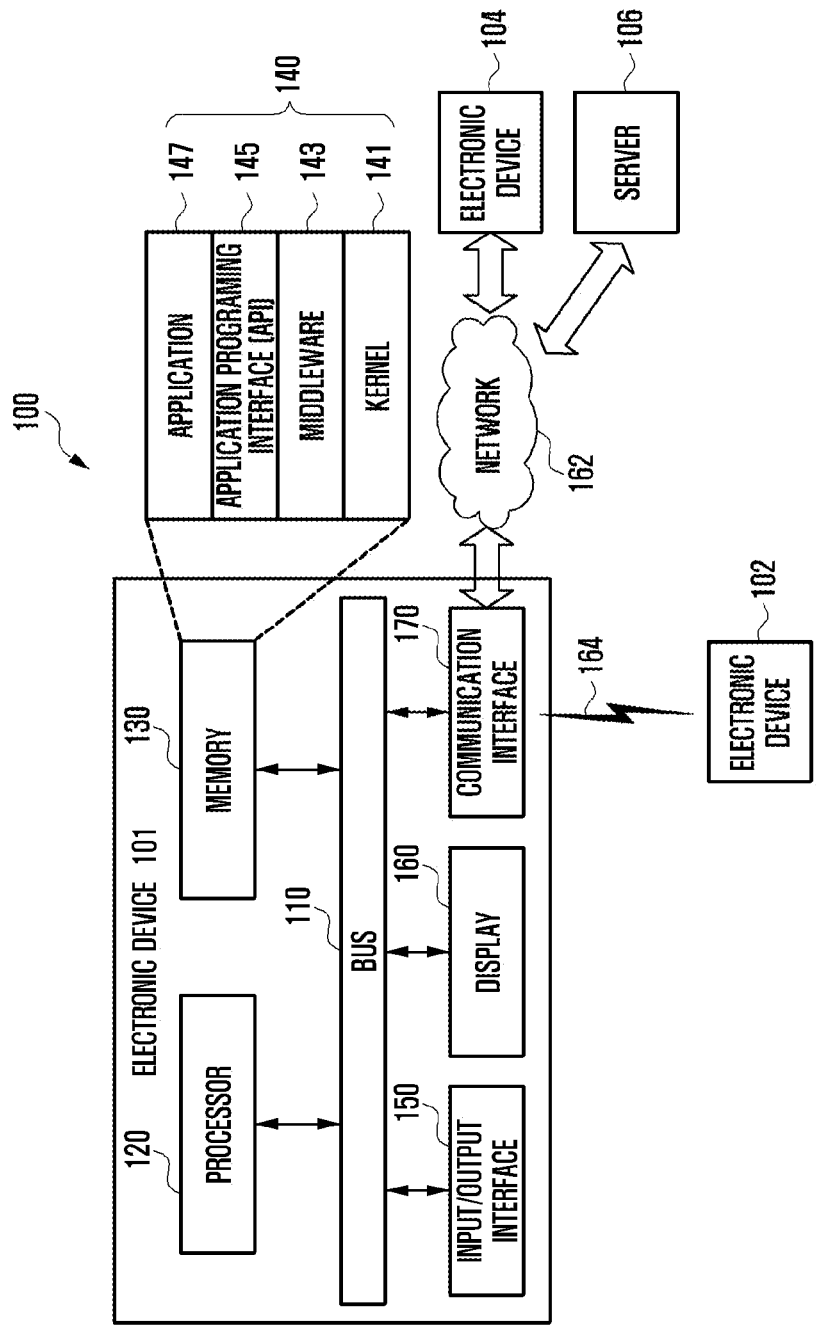
FIG. 1 illustrates a diagram of a network environment including in accordance with embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to aid in a comprehensive understanding of various example embodiments of the present disclosure as defined by the claims and their equivalents. It includes various details to assist in that understanding, but these are to be regarded as merely examples. Accordingly, those of ordinary skill in the art will recognize and understand that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various example embodiments of the present disclosure is provided for illustration purposes only and not for the purpose of limiting the present disclosure as defined by the appended claims and their equivalents.

It is to be understood that the singular forms "a," "an," and "the" include the plural form unless the context clearly dictates otherwise. Thus, for example, reference to "a component surface" includes reference to one or more of such surfaces.

The term "include" or "may include" which may be used in describing various example embodiments of the present disclosure may refer, for example, to the existence of a corresponding disclosed function, operation or component which can be used in various example embodiments of the present disclosure and does not limit one or more additional functions, operations, or components. In various example embodiments of the present disclosure, the terms such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various example embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various example embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. Similarly, without departing from the scope of the present disclosure, a first structural element may be referred to as a second structural element. The second structural element also may be referred to as the first structural element.

When it is stated that a component is "coupled to" or "connected to" another component, the component may be directly coupled or connected to another component or a further component may exist between the component and another component. On the other hand, when it is stated that a component is "directly coupled to" or "directly connected to" another component, an additional component does not exist between the component and another component.

The terms used in describing various example embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various example embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD) such as electronic glasses, electronic clothes, an electronic bracelet, an electronic necklace, an electronic accessory, an electronic tattoo, and a smart watch), or the like, but is not limited thereto.

According to some example embodiments of the present disclosure, the electronic device may be a smart home appliance having a communication function. The smart home appliance may include at least one of a television (TV), a digital versatile disc (DVD) player, an audio player, an air conditioner, a cleaner, an oven, a microwave oven, a washing machine, an air cleaner, a set-top box, a TV box (e.g., SAMSUNG HOMESYNC, APPLE TV, or GOOGLE TV), game consoles, an electronic dictionary, an electronic key, a camcorder, and an electronic frame, or the like, but is not limited thereto.

According to some example embodiments, the electronic device may include at least one of various types of medical devices (e.g., magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, a point of sale (POS) device of shops, and a device for Internet of things (IoT) (e.g., a fire alarm, various sensors, electric or gas meter units, a sprinkler, a thermostat, a streetlamp, a toaster, sport outfits, a hot-water tank, a heater, a boiler and the like), or the like, but is not limited thereto.

According to some example embodiments of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function, or the like, but is not limited thereto. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various example embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1 illustrates a diagram of an example network environment 100 including an electronic device 101 in accordance with embodiments of the present disclosure.

Referring to FIG. 1, the electronic device 101 may include various components including a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit connecting the above described components and transmitting communication (e.g., a control message) between the above described components.

The processor 120 may include various processing circuitry and receive commands from other components (e.g., the memory 130, the input/output interface 150, the display 160, or the communication interface 170) through the bus 110, analyze the received commands, and execute calculation or data processing according to the analyzed commands.

The memory 130 stores commands or data received from the processor 120 or other components (e.g., the input/output interface 150, the display 160, or the communication interface 170) or generated by the processor 120 or other components. The memory 130 may store a software and/or a program 140. For example, the program 140 may include a kernel 141, middleware 143, an application programming interface (API) 145, and an application program (or an application) 147. At least part of the kernel 141, the middleware 143 or the API 145 may refer to an operating system (OS).

The kernel 141 controls or manages system resources (e.g., the bus 110, the processor 120, or the memory 130) used for executing an operation or function implemented by the remaining other programming modules, for example, the middleware 143, the API 145, or the application 147. The kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. In operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (e.g., command) for a file control, a window control, image processing, or a character control.

The application 147 may include a short message service (SMS)/multimedia messaging service (MMS) application, an email application, a calendar application, an alarm application, a health care application (e.g., application measuring quantity of exercise or blood sugar) or an environment information application (e.g., application providing information on barometric pressure, humidity or temperature). The application 147 may be an application related to an information exchange between the electronic device 101 and an external electronic device (e.g., second external electronic device 104). The application 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., second external electronic device 104). The notification relay application may receive notification information from, for example, the second external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the second external electronic device 104, or a service (e.g., call service or message service) provided by the second external electronic device 104.

The application 147 may include an application designated according to an attribute (e.g., type of electronic device) of the second external electronic device 104. For example, when the second external electronic device 104 is a moving picture experts group (MPEG-1 or MPEG-2) audio layer-3 (MP3) player, the application 147 may include an application related to music reproduction. Similarly, when the second external electronic device 104 is a mobile medical device, the application 147 may include an application related to health care. The application 147 may include at least one of an application designated to the electronic device 101 and an application received from an external electronic device (e.g., a server 106 or the second external electronic device 104).

The input/output interface 150 may include various input/output circuitry and/or devices and transmits a command or data input from the user through an input/output device (e.g., a sensor, a keyboard, or a touch screen) to the processor 120, the memory 130, the communication interface 170, or the display 160 through, for example, the bus 110. For example, the input/output interface 150 may provide data on a user's touch input through a touch screen to the processor 120. Further, the input/output interface 150 may output a command or data received through, for example, the bus 110, from the processor 120, the memory 130, or the communication interface 170 through the input/output device (e.g., a speaker or a display). For example, the input/output interface 150 may output voice data processed through the processor 120 to the user through the speaker.

The display 160 may include, for example, liquid crystal display (LCD), flexible display, transparent display, light-emitting diode (LED) display, organic LED (OLED) display, microelectromechanical systems (MEMS) display, or electronic paper display, or the like, but is not limited thereto. The display 160 may visually offer, for example, various content (e.g., text, image, video, icon, symbol, etc.) to users. The display 160 may include a touch screen and receive, for example, a touch, gesture, proximity, or hovering input using an electronic pen or a user's body. The display 160 may be one or more displays. For example, the display 160 may be included in the electronic device 101 or included in an external device (e.g., a first external electronic device 102 or the second external electronic device 104) having a wired or wireless connection with the electronic device 101, thus outputting information offered by the electronic device 101 to users.

The display 160 may be attachable to or detachable from the electronic device 101. For example, the display 160 may include an interface which can be mechanically or physically connected to the electronic device 101. In case the display 160 is detached (e.g., separated) from the electronic device 101 by a user's selection, the display 160 may receive various control signals or image data from the processor 120, e.g., through wireless communication.

The communication interface 170 may include various communication circuitry and establish communication between the electronic device 101 and any external device (e.g., the first external electronic device 102, the second external electronic device 104, or the server 106). For example, the communication interface 170 may be connected to a network 162 through wired or wireless communication and thereby communicate with any external device (e.g., the first external electronic device 102, the second external electronic device 104, or the server 106). Additionally, the communication interface 170 may establish a short-range wireless communication with an external electronic device, such as, for example, and without limitation, external electronic devices 102, 104, or the like. The electronic device 101 may be connected to the first external electronic device 102 and the second external electronic device 104 without using the communication interface 170. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic devices 102 and 104, respectively, is attached to at least part of the electronic device 101.

Wireless communication may use, as cellular communication protocol, at least one of long-term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like. A short-range communication 163 may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a Glonass, a Beidou navigation satellite system (hereinafter, referred to as "Beidou"), and European global satellite-based navigation system (Galileo). Hereinafter, the "GPS" may be interchangeably used with the "GNSS" in the present disclosure.

Wired communication may include, for example, at least one of universal serial bus (USB), high definition multimedia interface (HDMI), recommended standard-232 (RS-232), plain old telephone service (POTS), and the like. The network 162 may include telecommunication network, for example, at least one of a computer network (e.g., local area network (LAN) or wide area network (WAN)), interne, and a telephone network.

The first and second external electronic devices 102 and 104 may be identical to, or different from, the electronic device 101. The first and second external electronic devices 102 and 104 may include, for example, a plurality of electronic devices. The server 106 may include a single server or a group of servers. All or part of operations executed in the electronic device 101 may be executed in other electronic device(s), such as the first and second external electronic devices 102 and 104 or the server 106.

In case the electronic device 101 is used to perform a certain function or service automatically or by request, the electronic device 101 may request another device (e.g., the first external electronic device 102 or the second external electronic device 104 or the server 106) to execute instead, or additionally at least part, of at least one or more functions associated with the used function or service. The requested device may execute the requested function and deliver the result of execution to the electronic device 101. Then, the electronic device 101 may offer the used function or service, based on the received result or by processing the received result. For the above, cloud computing technology, distributed computing technology, or client-server computing technology may be used, for example.

Figure 2:
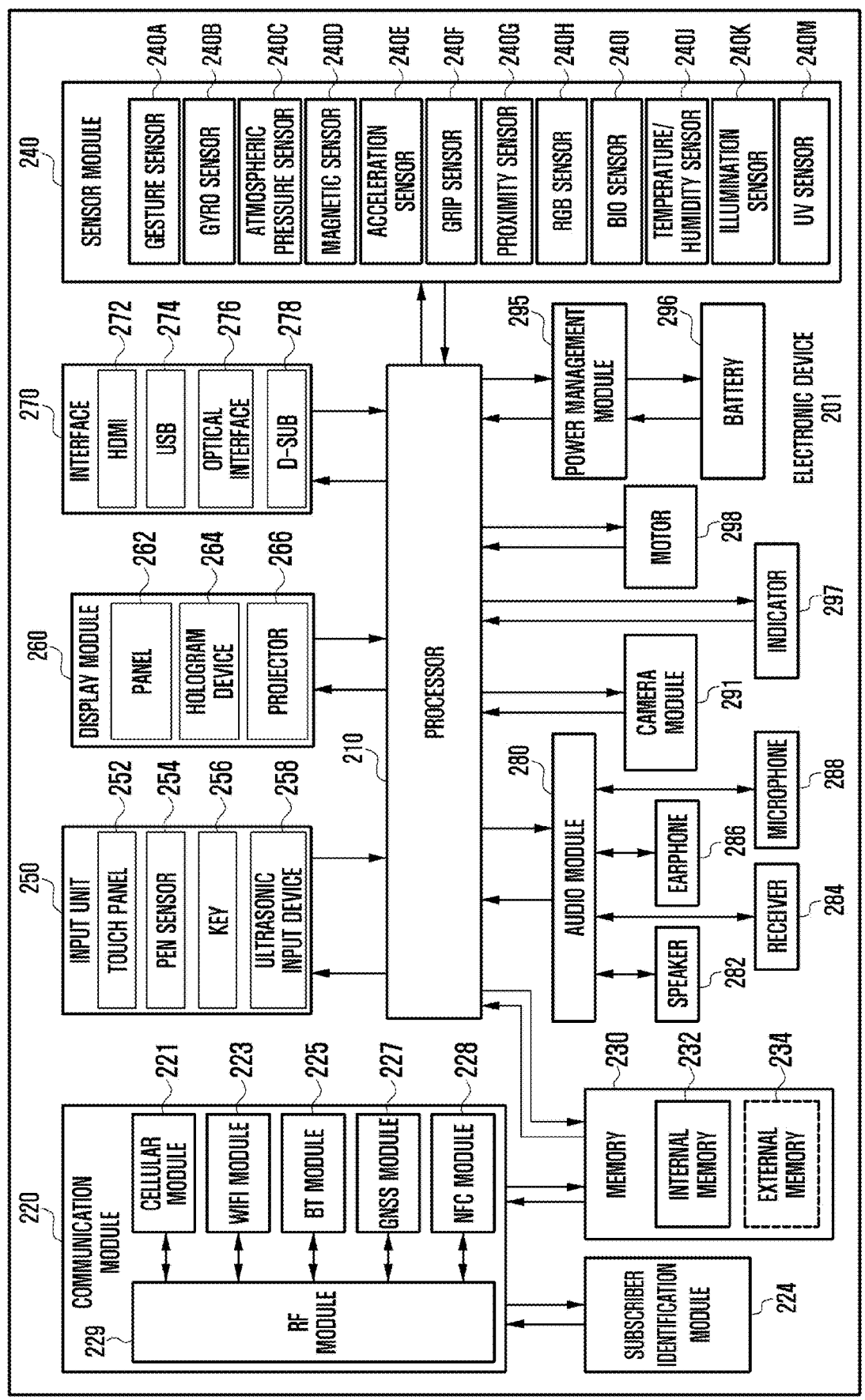
FIG. 2 illustrates a block diagram of an electronic device in accordance with embodiments of the present disclosure.

FIG. 2 illustrates a block diagram of an example configuration of an electronic device in accordance with embodiments of the present disclosure.

Referring to FIG. 2, for example, the electronic device 201 may include part or all of the components in the electronic device 101 illustrated in FIG. 1. The electronic device 201 may include one or more processors (e.g., including processing circuitry) 210 (e.g., application processors (APs)), a communication module (e.g., including communication circuitry) 220, a subscriber identification module (SIM) 224, a memory 230, a sensor module 240, an input module (e.g., including input circuitry) 250, a display module 260, an interface (e.g., including interface circuitry) 270, an audio module 280, a camera module 291, a power management module 295, a battery 296, an indicator 297, and a motor 298.

The processor 210 may include various processing circuitry, such as, for example, and without limitation, a dedicated processor, a CPU, an application processor, an application specific integrated circuit, or the like, and is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of the components illustrated in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 220 may include various communication circuitry, such as, for example, and without limitation, the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating the electronic device 201 in a communication network by using the SIM 224 (e.g., a SIM card). The cellular module 221 may be capable of performing at least part of the functions provided by the processor 210. The cellular module 221 may also include a communication processor (CP).

Each of the Wi-Fi module 223, the BT module 225, the GNSS module 227, and the NFC module 228 may include a processor and various communication circuitry for processing data transmitted or received through the corresponding module. At least part of the cellular module 221, Wi-Fi module 223, BT module 225, GNSS module 227, and NFC module 228, (e.g., two or more modules) may be included in one integrated chip (IC) or one IC package.

The RF module 229 is capable of transmission/reception of communication signals, e.g., RF signals. The RF module 229 may include a transceiver, a power amp module (PAM), a frequency filter, a low noise amplifier (LNA), an antenna, etc. According to another embodiment of the present disclosure, at least one of the following modules: cellular module 221, Wi-Fi module 223, BT module 225, GNSS module 227, NFC module 228, and MST module is capable of transmission/reception of RF signals through a separate RF module.

The SIM module 224 may include a card including a SIM and/or an embodied SIM. The SIM module 224 may also contain unique identification information, e.g., integrated circuit card identifier (ICCID), or subscriber information, e.g., international mobile subscriber identity (IMSI).

The memory 230 (e.g., memory 130 illustrated in FIG. 1) may include a built-in internal memory 232 and/or an external memory 234. The built-in internal memory 232 may include at least one of the following a volatile memory, e.g., a dynamic random access memory (DRAM), a static RAM (SRAM), a synchronous dynamic RAM (SDRAM), etc., and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro-SD, a mini-SD, an extreme digital (xD), a multi-media card (MMC), a memory stick, etc. The external memory 234 may be connected to the electronic device 201, functionally and/or physically, through various interfaces.

The memory 230 may store payment information and a payment application serving as one of the application programs. The payment information may refer to credit card numbers and personal identification numbers (PINs), corresponding to a credit card. The payment information may also include user authentication information, e.g., fingerprints, facial features, voice information, etc.

The sensor module 240 may measure/detect a physical quantity or an operation state of the electronic device 201, and convert the measured or detected information into an electrical signal. The sensor module 240 may include at least one of the following a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor may control the sensor module 240.

The input module 250 may include various input circuitry, such as, for example, and without limitation, a touch panel 252, a digital pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer to offer a tactile feedback to a user. The touch panel 252 may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include, for example, a physical button, an optical key, or a keypad. The ultrasonic input device 258 may detect ultrasonic waves occurring at an input tool through a microphone (e.g., 288) and thereby identify data corresponding to the detected ultrasonic waves.

The display 260 may include a panel 262, a hologram device 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram device 264 may show a stereoscopic image in the air by using light interference. The projector 266 may display an image by projecting light onto a screen. The screen may be located inside or outside of the electronic device 201. The display 260 may further include a control circuit for controlling the panel 262, the hologram device 264, or the projector 266.

The interface 270 may include various interface circuitry, such as, for example, and without limitation, a high-definition multimedia interface (HDMI) 272, a USB 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 may provide bidirectional conversion between a sound and an electronic signal. At least part of the components in the audio module 280 may be included in the input/output interface 150 shown in FIG. 1. The audio module 280 may process sound information input or output through a speaker 282, a receiver 284, earphones 286, microphone 288, etc.

The camera module 291 may take both still and moving images. The camera module 291 may include one or more image sensors (e.g., a front image sensor or a rear image sensor), a lens, an ISP, a flash (e.g., an LED or xenon lamp), etc.

The power management module 295 is capable of managing power of the electronic device 201. The power management module 295 may include a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge may measure the residual capacity, charge in voltage, current, or temperature of the battery 296. The battery 296 takes the form of either a rechargeable battery or a solar battery.

The indicator 297 may display a specific status of the electronic device 201 or a part thereof (e.g., the processor 210), e.g., a boot-up status, a message status, a charging status, etc. The motor 298 may convert an electrical signal into mechanical vibrations, such as, a vibration effect, a haptic effect, etc. Although not shown, the electronic device 201 may further include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or MEDIAFLO, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
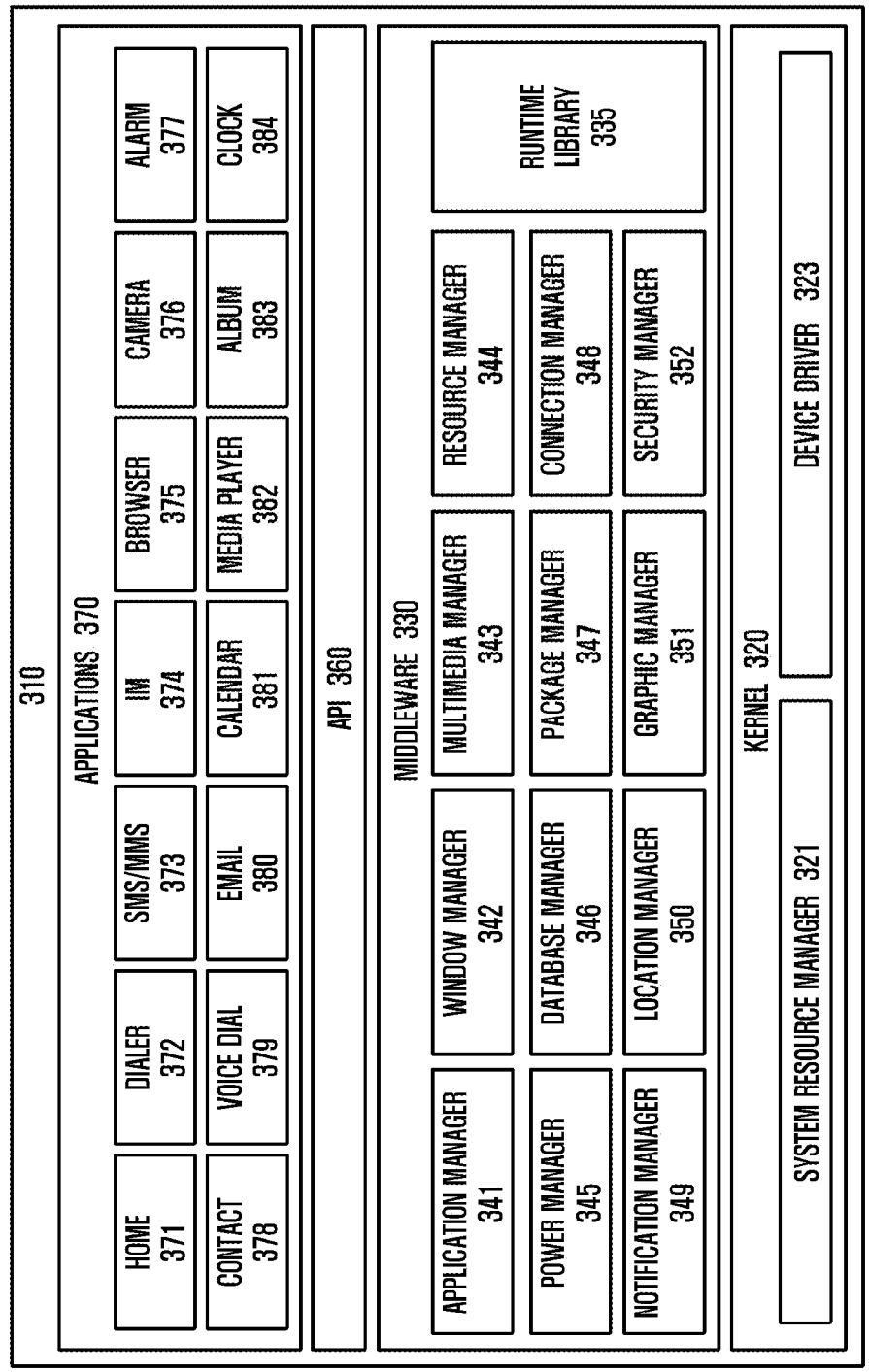
FIG. 3 illustrates a block diagram of a program module in accordance with embodiments of the present disclosure.

FIG. 3 illustrates a block diagram of an example programming module in accordance with embodiments of the present disclosure.

Referring to FIG. 3, the program module 310 (e.g., program 140 shown in FIG. 1) may include an OS for controlling resources related to the electronic device (e.g., electronic device 101) and/or various applications (e.g., application 147 shown in FIG. 1) running on the OS. The OS may be ANDROID, IOS, WINDOWS, SYMBIAN, TIZEN, BADA, or the like, but is not limited thereto.

The program module 310 may include a kernel 320, middleware 330, API 360 and/or applications 370. At least part of the program module 310 may be preloaded on the electronic device or downloaded from a server (e.g., the first external electronic device 102 or the second external electronic device 104, the server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a BT driver, a shared memory driver, a USB driver, a keypad driver, a Wi-Fi driver, and an audio driver. Further, the device driver 323 may include an inter-process communication (IPC) driver.

The middleware 330 may provide a function used in common by the applications 370. The middleware 330 may provide a function through the API 360 to allow the applications 370 to efficiently use limited system resources within the electronic device. The middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format used for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information used for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface (UI) related to the graphic effect. The security manager 352 provides a general security function used for a system security or a user authentication. When the electronic device (for example, the electronic device 101) has a call function, the middleware 330 may further include a telephony manager for managing a voice of the electronic device or a video call function.

The middleware 330 may include modules configuring various combinations of functions of the above described components. The middleware 330 may provide modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an OS. For example, in Android or iOS, a single API set may be provided for each platform. In TIZEN, two or more API sets may be provided.

The applications 370 (e.g., application 147) may include one or more applications for performing various functions, for example, and without limitation, home 371, dialer 372, SMS/MMS 373, instant message (IM) 374, browser 375, camera 376, alarm 377, contact 378, voice dial 379, email 380, calendar 381, media player 382, album 383, clock 384. Additionally, or alternatively, though not shown, the applications 370 may include various other applications, such as, for example, and without limitation, health care (e.g., an application for measuring amount of exercise, blood sugar level, etc.), and environment information (e.g., an application for providing atmospheric pressure, humidity, temperature, etc.).

The applications 370 may include an application for supporting information exchange between an electronic device (e.g., the electronic device 101) and an external device (e.g., the first and second external electronic devices 102 and 104), which is hereafter called 'information exchange application'). The information exchange application is capable of including a notification relay application for relaying specific information to external devices or a device management application for managing external devices.

For example, the notification relay application may include a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application may manage (e.g., install, remove or update) at least one function of an external device (e.g., the first and second external electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

The applications 370 may include an application (e.g., a health care application of a mobile medical device, etc.) specified attributes of an external device (e.g., the first and second external electronic devices 102 and 104). The applications 370 may include applications received from an external device (e.g., the server 106, the first and second external electronic devices 102 and 104). The applications 370 may include a preloaded application or third party applications that can be downloaded from a server. It should be understood that the components of the program module 310 may be called different names according to types of OS.

According to various example embodiments of the present disclosure, at least part of the program module 310 can be implemented with software, firmware, hardware, or any combination thereof. At least part of the program module 310 can be implemented (e.g., executed) by a processor (e.g., processor 120). At least part of the programing module 310 may include modules, programs, routines, sets of instructions or processes, etc., in order to perform one or more functions.

The term 'module' as used in various example embodiments of the present disclosure may refer, for example, to a unit including one of hardware, software, and firmware or any combination thereof. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include, for example, and without limitation, at least one of a dedicated processor, a CPU, application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments of the present disclosure can be implemented with instructions as programming modules that may be stored in computer-readable storage media. One or more processors (e.g., processor 120) can execute instructions, thereby performing the functions. An example of the computer-readable storage media may be the memory 130. At least part of the programming modules can be implemented (executed) by a processor. At least part of the programing module may include modules, programs, routines, sets of instructions or processes, etc., in order to perform one or more functions.

Examples of computer-readable media include magnetic media, such as hard disks, floppy disks, and magnetic tape, optical media such as compact disc-ROM (CD-ROM) disks and DVD, magneto-optical media, such as floptical disks, and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments of the present disclosure may include one or more components, remove part of them described above, or include new components. The operations performed by modules, programming modules, or the other components, according to various embodiments of the present disclosure, may be executed in serial, parallel, repetitive or heuristic fashion. Part of the operations can be executed in any other order, skipped, or executed with additional operations.

The various example embodiments described in the present disclosure are merely provided to assist in a comprehensive understanding of the disclosure and the technology thereof and are not suggestive of limitation. Although various example embodiments of the disclosure have been described in detail above, it should be understood that many variations and modifications of the disclosure herein described, which may be apparent to those skilled in the art, will still fall within the spirit and scope of the various example embodiments of the disclosure as defined in the appended claims.

Figure 4:
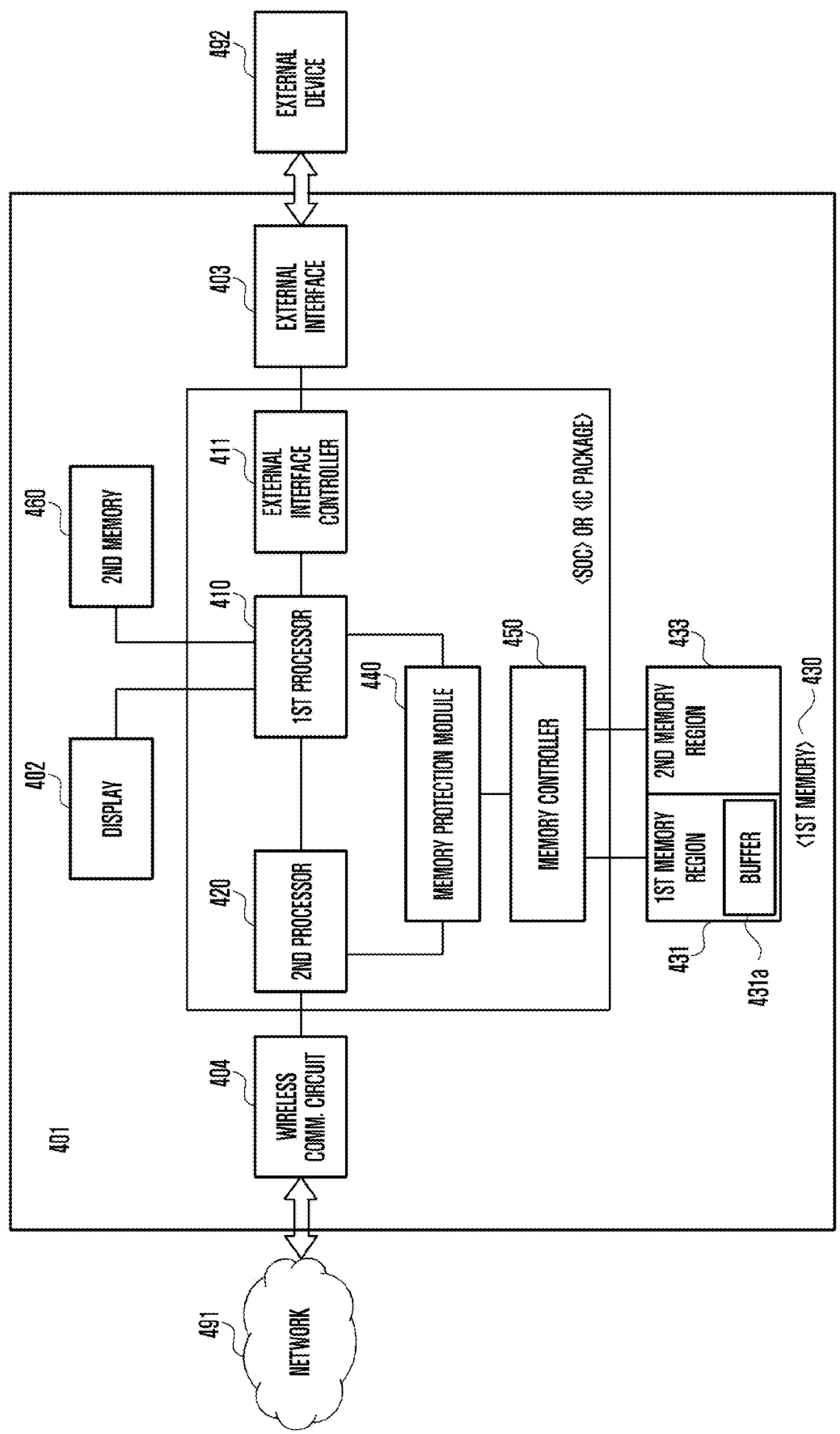
FIG. 4 illustrates is a block diagram of an electronic device operating as a mobile device and connected to an external device in accordance with embodiments of the present disclosure.

FIG. 4 illustrates a block diagram of an electronic device operating as a mobile device and connected to an external device in accordance with embodiments of the present disclosure.

According to various embodiments of the present disclosure, an electronic device 401 shown in FIG. 4 may include all or parts of the electronic device 201 shown in FIG. 2.

Specifically, the electronic device 401 according to various embodiments of the present disclosure may include a housing (not shown), a display 402, an external interface 403, a wireless communication circuit 404 (e.g., the RF module 229 in FIG. 2), a first processor 410, an external interface controller 411, a second processor 420, a first memory 430, a memory protection module 440, a memory controller 450, and a second memory 460.

According to various embodiments of the present disclosure, the display 402 may be exposed through a first portion (e.g., a front surface) of the housing. The external interface 403 may include an electrical connector (e.g., a USB connector) exposed through a second portion (e.g., a side surface) of the housing. Here, the connector may include a plurality of electrical contacts, which may be electrically connected to an external device 492 through, for example, a USB cable. The electronic device 401 may offer USB tethering, i.e., an Internet access function, to the external device 492 connected to the USB connector. The external interface 403 is an interface for wireless connection with the external device 492 and offering a tethering function to the external device 492. The external interface 403 may include the Wi-Fi module 223 or the BT module 225 shown in FIG. 2.

According to various embodiments of the present disclosure, the first processor 410 may be, for example, an application processor (AP), and may be electrically connected to the display 402 and the external interface 403. The external interface controller 411 may be electrically connected between the first processor 410 and the external interface 403, and may offer an interface that enables the first processor 410 to perform data communication with the external device 492 connected to the external interface 403. The second processor 420 may be, for example, a communication processor (CP), and may be electrically connected to the wireless communication circuit 404. The memory controller 450 may be electrically connected between the first memory 430 and the memory protection module 440, and may offer an interface that enables the first and second processors 410 and 420 to access the first memory 430 through the memory protection module 440.

According to various embodiments of the present disclosure, the first processor 410, the external interface controller 411, the second processor 420, the memory protection module 440, and the memory controller 450 may be included in, for example, an integrated circuit (IC) package or a system on chip (SoC). The first and second processors 410 and 420 may load instructions or data, received from the second memory 460 (e.g., a nonvolatile memory), onto the first memory 430 (e.g., a dynamic random access (DRAM)) and then process them. The second processor 420 may be connected to the wireless communication circuit 404 and perform data communication with any other device via a network 491.

According to various embodiments of the present disclosure, the first memory 430 may include a first memory region 431 for which an access right (i.e., a read and write right) is granted to the first processor 410, and a second memory region 432 for which an access right is granted to the second processor 420. According to various embodiments, the first memory 430 may further include a secure region (not shown) for which an access right is granted to a portion of the first processor 410, e.g., a security operating system (OS).

According to various embodiments of the present disclosure, such access rights for respective regions of the first memory 430 with respect to a plurality of processors may be set and/or included in the memory protection module 440. For example, the electronic device (e.g., the first processor 410) may set (program) an access right for each memory region in the memory protection module 440 at the time of booting.

According to various embodiments of the present disclosure, at least some cores of the first processor 410 may enter a secure mode (e.g., entrance into trust zone which is a secure mode of the Arm core processor) and perform setting of the memory protection module 440.

According to various embodiments of the present disclosure, the first processor 410 may request a separate third processor (not shown) to set the memory protection module 440, and then the third processor may perform setting of the memory protection module 440.

According to various embodiments of the present disclosure, the electronic device (e.g., the first processor 410) may update (or change) the right of the memory protection module 440 during runtime (e.g., at the time of setting a buffer 431a for USB tethering).

According to various embodiments of the present disclosure, when the external device 492 is electrically connected to the first processor 410 through the external interface 403, a part of the first memory region 431 may be allocated as the buffer 431a by the first processor 410 (e.g., a USB driver). The first processor 410 may notify the start of tethering (via inter processor communication (IPC)) to the second processor 420. According to one embodiment, the first processor 410 may request (or set) the memory protection module 440 to update (or change) the right of the allocated buffer 431a. According to one embodiment, the first processor 410 may deliver (via the IPC) information indicating the allocation to the second processor 420.

According to various embodiments of the present disclosure, the buffer 431a (e.g., a USB buffer) allocated by the first processor 410 may include an upload region for writing data to be transferred to the network 491 through the second processor 420 (namely, an Rx buffer region for storing data received from the external device 492), and a download region for writing data to be transferred to the external device 492 through the first processor 410 (namely, a Tx buffer region).

According to various embodiments of the present disclosure, the memory protection module 440 may include information indicating the access right of the second processor 420 for the first memory region 431. For example, at the time of booting, the first processor 410 may allocate a part of the first memory region 431 as a buffer accessible by the second processor 420 and then set an address of the allocated part in the memory protection module 440. Also, the first processor 410 may notify information about the address of the allocated part to the second processor 420 so that the second processor 420 may access the buffer 431a through the memory protection module 440.

According to various embodiments of the present disclosure, the memory protection module 440 may provide relations between a plurality of addresses in the first memory region 431 (e.g., addresses corresponding to the buffer 431a) and a plurality of virtual addresses in the second memory region 433. For example, the memory protection module 440 may be formed of a plurality of tables (i.e., registers or buffers). By registering the addresses of the buffer 431a in the table, virtual addresses may be mapped to the addresses of the buffer 431a. Here, the virtual address indicates a physical memory address assigned to the second processor 420. Using this virtual address, the second processor 420 may access the buffer 431a through the memory protection module 440 and then read data from the buffer 431a or write data to the buffer 431a. For example, when a memory access request is received from the second processor 420, the memory protection module 440 may determine whether a physical memory region corresponding to a virtual memory region to be accessed by the second processor 420 is the buffer 431a of the first memory region 431. If the physical memory region corresponding to the virtual memory region to be accessed by the second processor 42 is the buffer 431a, the memory protection module 440 may permit the second processor 420 to access the buffer 431a. Also, the memory protection module 440 may forbid the second processor 420 to access any part of the first memory region 431 other than the buffer 431a.

According to various embodiments of the present disclosure, in place of the memory protection module 440, the first processor 410 may set the access right of the second processor 420 for the first memory region 431. For example, when the external device 492 is electrically connected to the first processor 410 through the external interface 403, or when a tethering function (i.e., Internet connection with the external device 492 connected via the external interface 403) is selected by the user, the first processor 410 may allocate a part of the first memory region 431 as the buffer 431a which is a shared memory region accessible by the second processor 420. The first processor 410 may cause the virtual address to be mapped to the address of the buffer 431a by registering the address of the buffer 431a in the memory protection module 440. As a result, the second processor 420 may access the buffer 431a through the virtual addresses.

According to various embodiments of the present disclosure, the external interface controller 411 (e.g., a USB controller) that is controlled by the first processor 410 may recognize the external device 492 through the external interface 403. For example, when the external device 492 is connected to a USB connector, the first processor 410 may recognize this and then load, into the first memory 430 from the second memory 460, instructions configured to operate as a USB composite driver. The USB composite driver provides an interface for data communication with the external device 492. For example, the USB composite driver may include a media transfer protocol (MTP) driver, a tethering driver (e.g., a remote network driver interface specification (RNDIS) driver), a USB mass storage (UMS) driver, a picture transfer protocol (PTP) driver, and the like. For example, if a function to be used as a mobile terminal (i.e., a client device) is preconfigured with MTP when the electronic device 401 is connected to the external device 492, the MTP driver may be loaded into the first memory 430 from the second memory 460. If the user selects another function, e.g., USB tethering, through a setting menu, the MTP driver may be unloaded and deactivated, and instead a tethering driver may be loaded into the first memory 430 and activated.

According to various embodiments of the present disclosure, when the external device 492 is connected to the USB connector, the first processor 410 may recognize this connection and then load, into the first memory 430 from the second memory 460, instructions configured to operate as a tethering driver. According to various embodiments of the present disclosure, the external interface controller 411 (e.g., a USB controller) is a physical interface (e.g., a USB physical interface) for data communication with the external device 492, is controlled by the first processor 410, and may relay communication with the external device 492 connected through the external interface 403. The first processor 410 may connect a channel for data communication with the external device 492 through the external interface controller 411. For example, by performing a USB enumeration procedure through an endpoint #0, the first processor 410 may establish a state in which a selected function (e.g., USB tethering) is possible. For example, the USB enumeration procedure may include composition setting and interface setting. The composition setting may be the first procedure performed when the electronic device 401 is connected to the external device 492. In this procedure, in response to a request of the external device 492, the first processor 410 (and/or the external interface controller 411) may deliver basic information (e.g., manufacturer information, a model name, etc.) of the electronic device 401 to the external device 492, and also identify the type and version of an operating system of the external device 492. The interface setting may be a procedure of mapping a function of the electronic device 401 and a driver used in the external device 492 so as to use the function of the electronic device 401 (e.g., USB tethering). Herein, the function of the electronic device 401 may be all functions provided by the electronic device 401 via the USB interface, and may be a function provided by a driver set as default or selected by the user. Meanwhile, the external device 492 that is connected to the electronic device 401 may read a descriptor from the electronic device 401 so as to know information and settings about the electronic device 401. When the external device 492 requests device information to the electronic device 401, the first processor 410 (and/or the external interface controller 411) may offer the descriptor, as information of the electronic device 401, to the external device 492. Through the descriptor received from the electronic device 401, the external device 492 may know the type of the electronic device 401 and perform processing such as adjusting the amount of data transmission depending on the characteristics of the electronic device 401. The descriptor may be, for example, a device descriptor, a configuration descriptor, an interface descriptor, an endpoint descriptor, a string descriptor, and the like.

According to various embodiments of the present disclosure, the first processor 410 (e.g., a tethering driver) may deliver a tethering start command indicating the start of the tethering function to the second processor 420. In addition, the first processor 410 (e.g., a tethering driver) may allocate the buffer (e.g., a USB buffer) for communication with the external device 492 and set the buffer to be accessible by the second processor 420 (e.g., by sending a request to the memory protection module 440).

According to various embodiments of the present disclosure, in response to the tethering start command of the first processor 410, the second processor 420 may generate an IP address to be allocated to the external device 492 by driving a dynamic host configuration protocol (DHCP) server and deliver the IP address to the external device 492 through the first processor 410. Alternatively, the generation of the IP address may be performed in the first processor 410. In one embodiment, the second processor 420 may receive information indicating buffer allocation from the first processor 410 and use the buffer 431a allocated by the first processor 410 in the tethering function.

According to various embodiments of the present disclosure, the second processor 420 may convert (i.e., packetize) transmission control protocol/internet protocol (TCP/IP) data, received from the network 491 through the wireless communication circuit 404, into USB data corresponding to a connection scheme with the external device 492. In the opposite direction, the second processor 420 may convert (i.e., packetize) USB data, received from the external device 492, into TCP/IP data for communication with the network 491 through the wireless communication circuit 404.

According to various embodiments of the present disclosure, the second processor 420 performs communication with the Internet network, and the first processor 410 performs communication with, for example, a USB Ethernet network. This may utilize a network address translation (NAT) process for data communication between different networks. Therefore, the second processor 420 may translate an IP address of network packet data and an IP address of the external device 492 to each other. According to an embodiment, the second processor 420 may write the USB data converted with the IP address in the download region of the buffer 431a through the memory protection module 440 so that the USB data may be delivered to the external device 492. The above operations may be performed by the second processor 420 and modules (not shown) controlled by the second processor 420.

According to various embodiments of the present disclosure, a connection scheme with the external device 492 is not limited to USB and may be Wi-Fi or Bluetooth. Namely, when the electronic device 401 is connected to the external device 492 through Wi-Fi or Bluetooth, TCP/IP data may be converted (i.e., packetized) into data corresponding to Wi-Fi or Bluetooth.

According to various embodiments of the present disclosure, the second processor 420 may read data recorded in the upload region of the buffer 431a, convert the read data into TCP/IP data, and translate an IP address of the TCP/IP data into an IP address of the electronic device 401. The second processor 420 may transmit the IP address-translated TCP/IP data to the network 491 through the wireless communication circuit 404.

Figure 5:
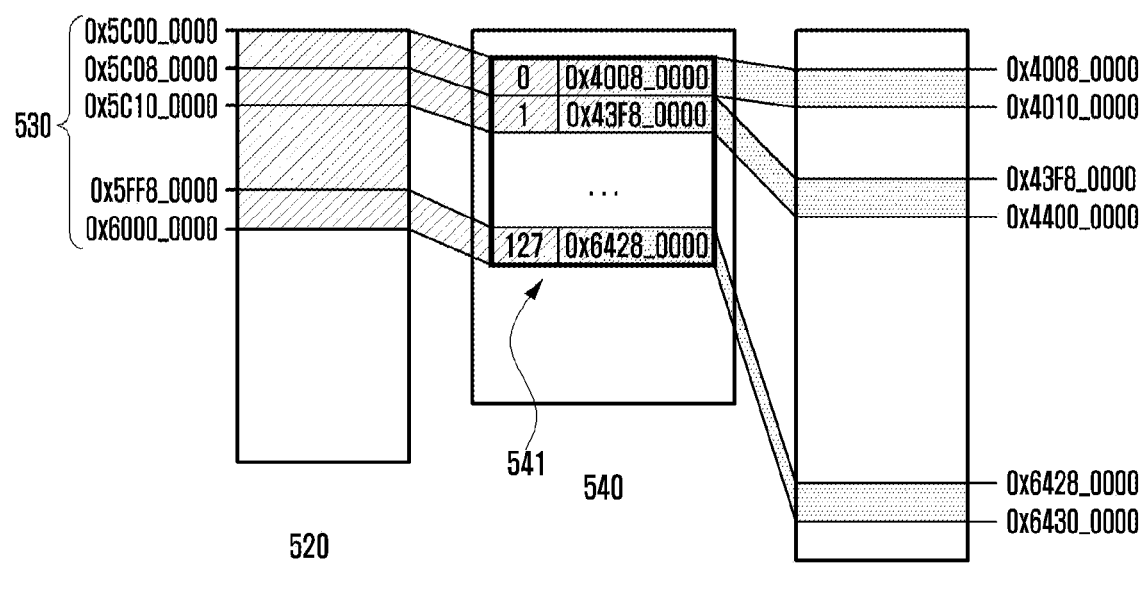
FIG. 5 illustrates a diagram of a method or mapping a virtual memory address to an address of a physical memory in an electronic device in accordance with embodiments of the present disclosure.

FIG. 5 illustrates a diagram of a method or mapping a virtual memory address to an address of a physical memory in an electronic device in accordance with embodiments of the present disclosure.

According to various embodiments of the present disclosure, the electronic device shown in FIGS. 4 and 5 may include all or parts of the electronic device 201 shown in FIG. 2. The processor (e.g., the processor 210 in FIG. 2) may include, for example, the AP as the first processor 410 for data communication with the external device 492, and the CP as the second processor 420 for data communication with the network 491.

According to various embodiments of the present disclosure, the second processor 420 may process data by loading the data into a physical second memory region 520 (e.g., included in the second memory region 433). The first processor 410 may process data by loading the data into a physical first memory region 510 (e.g., the first memory region 431). In other words, the second memory region 520 may be included in the second memory region 433 for which an access right is granted to the second processor 420, and the first memory region 510 may be the first memory region 431 for which an access right is granted to the first processor 410.

According to various embodiments of the present disclosure, the memory protection module 540 may be implemented in the form of one SoC or one IC package together with the processors 410 and 420. The memory protection module 540 may include a plurality (e.g., 128) of tables 541 (i.e., registers or buffers). An address of the first memory region 510 may be recorded in each table, and an index for table identification may be assigned to each table. For example, an address of an upload region of a buffer (e.g., the buffer 431a) for tethering (e.g., USB tethering, Bluetooth tethering, or Wi-Fi tethering) may be recorded in a table corresponding to the index '0', and an address of a download region may be recorded in a table corresponding to the index '1'. Here, the address recording may be executed by the first processor 410. In addition, the first processor 410 may map virtual addresses 530 of the second memory region 520 to the indexes 0 and 1 so that the second processor 420 can access addresses of the first memory region 510 corresponding to the indexes 0 and 1.

Figure 6:
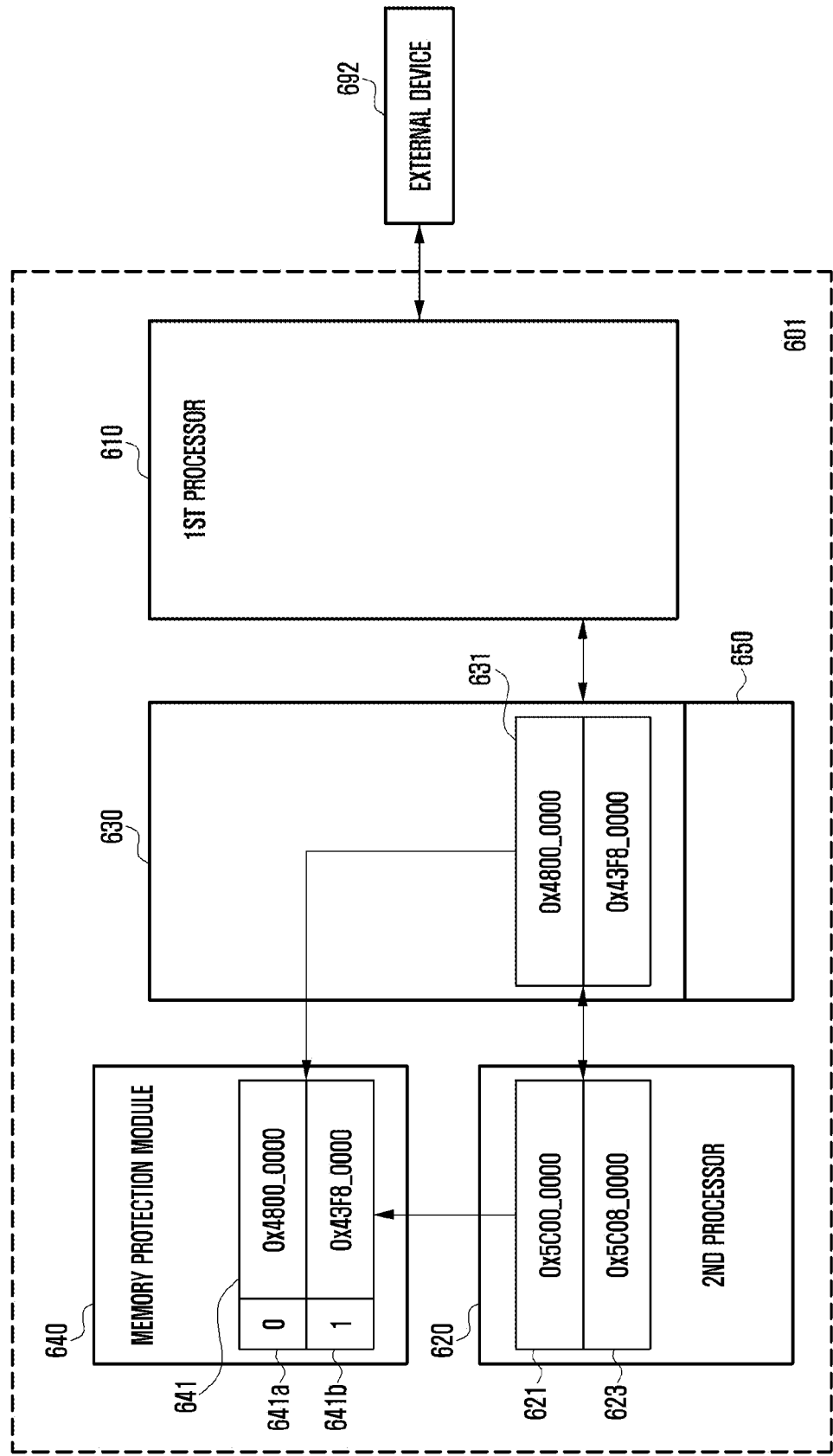
FIG. 6 illustrates a diagram of a tethering operation using a memory protection module in an electronic device in accordance with embodiments of the present disclosure.

FIG. 6 illustrates a diagram of a tethering operation using a memory protection module in an electronic device in accordance with embodiments of the present disclosure.

According to various embodiments of the present disclosure, an electronic device 601 shown in FIG. 6 may include all or parts of the electronic device 201 shown in FIG. 2.

According to various embodiments of the present disclosure, at the time of booting the electronic device 601, a first processor 610 may record addresses of a shared memory region 631 of a first memory region 630, which can be used by a second processor 620, in a specific register 641 of a memory protection module 640. According to various embodiments of the present disclosure, while booting, the second processor 620 may read and use a start address and size of a second memory region 650 that can be used by the second processor 620.

According to various embodiments of the present disclosure, the electronic device 601 (e.g., the first processor 610) may perform a process of initializing the memory protection module 640 after booting the second processor 620. The shared memory region 631 accessible by the second processor 620 through the memory protection module 640 may be fixed according to the memory protection module 640 or may be changed during tethering execution. For example, the memory protection module 640 may have 128 tables with fixed address values. The 0th table 641a is accessible with a virtual address "0x5C00_0000" 621 and may have a size of 512 KB. The first table 641b is accessible with a virtual address "0x5C08_0000" 623 and may have a size of 512 KB. A total of 64 MB is accessible. Therefore, when the initialization process of the memory protection module 640 is performed after booting the second processor 620, the second processor 620 may access the shared memory region 631 through the memory protection module 640 by using the virtual addresses from '0x5C00_0000' to '0x6000_0000' (64 MB in total) initialized by the memory protection module 640. According to various embodiments of the present disclosure, upon initialization of the memory protection module 640, the electronic device 601 (e.g., the first processor 610) may specify the size to be used in the memory protection module 640.

According to various embodiments of the present disclosure, when tethering is started after an external device 692 is connected, the first processor 610 may inform, e.g., using IPC communication, the second processor 620 that the first processor 610 operates as a USB driver and tethering is started.

According to various embodiments of the present disclosure, the first processor 610 that operates as a USB driver may allocate an Rx buffer and a Tx buffer, and may update the allocated addresses to the memory protection module 640. If a buffer size used is equal to less than 512 KB, the first processor 610 may allocate an unused table of the memory protection module 640 and inform the second processor 620. For example, if the 0th table 641a is unused, the first processor 610 may inform the second processor 620 that the address of the 0th table 641a will be used as the Rx buffer.

According to various embodiments of the present disclosure, using the received information, the second processor 620 may map the virtual addresses 621 and 623 to the Rx buffer and the TX buffer and start data communication. The corresponding Rx data and Tx data may be packets to which TCP/IP packets are mapped with USB RNDIS. The subsequent communication is normal network communication, and may include a DHCP process for IP address allocation.

Figure 7A:
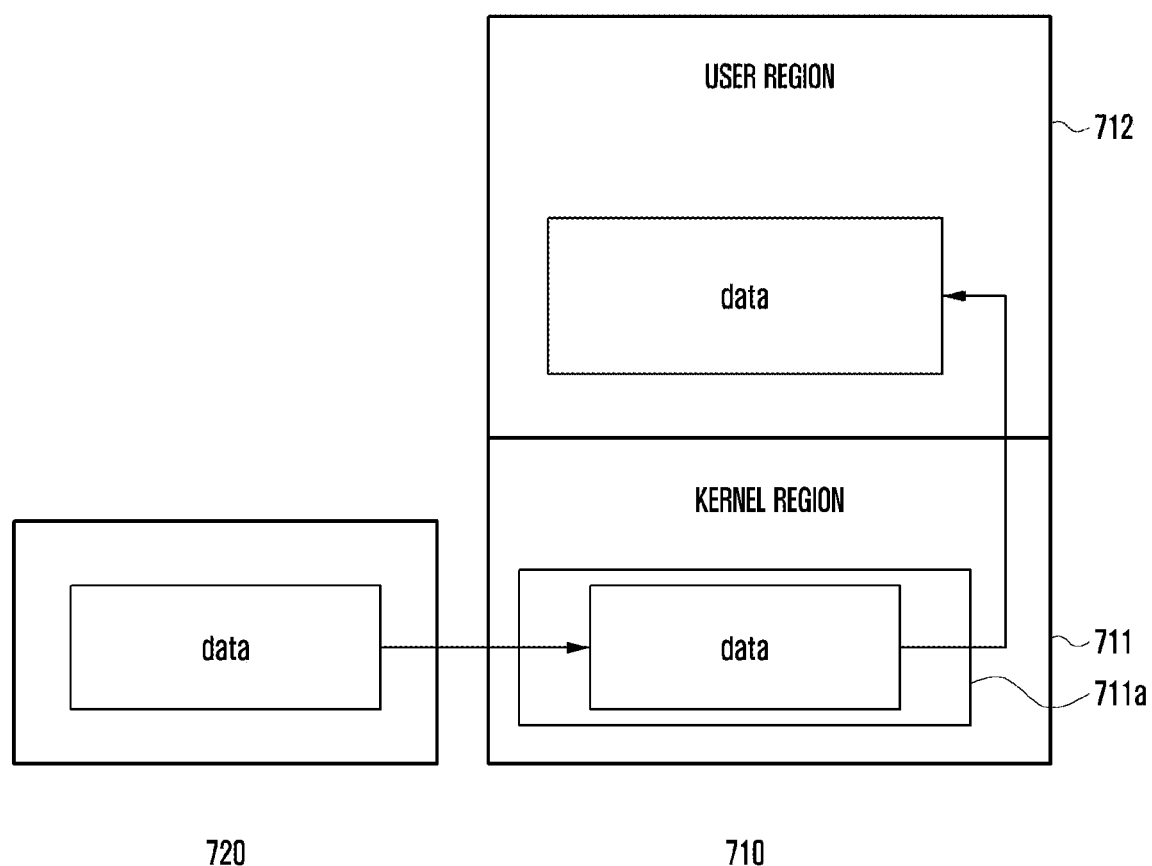
FIGS. 7A and 7B illustrates inter processor communication (IPC) in an electronic device in accordance with embodiments of the present disclosure.
Figure 7B:
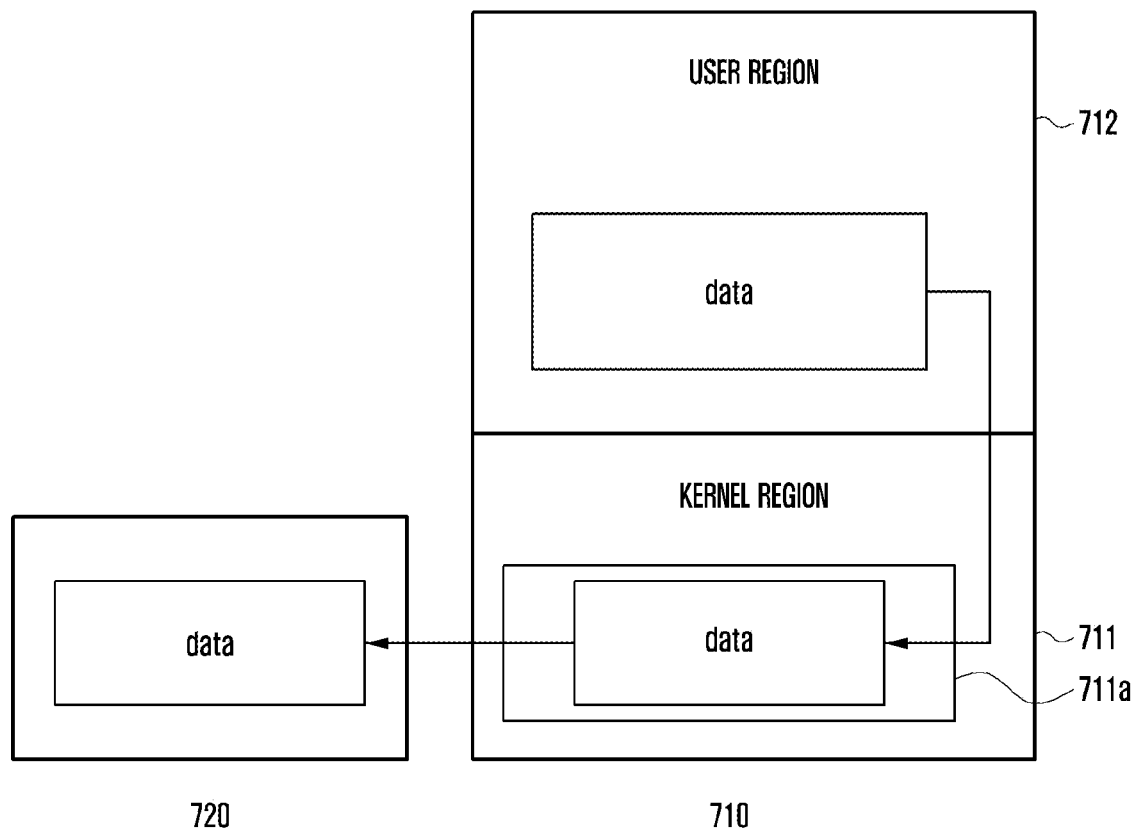

FIGS. 7A and 7B illustrate inter processor communication (IPC) in an electronic device in accordance with embodiments of the present disclosure. The electronic device may include all or parts of the electronic device 201 shown in FIG. 2. As also shown in FIG. 4, the processor (e.g., the processor 210 in FIG. 2) may include, for example, the AP as the first processor 410 for data communication with the external device 492, and the CP as the second processor 420 for data communication with the network 491.

According to various embodiments of the present disclosure, the second processor 420 may process data by loading the data into a second memory region 720 (e.g., included in the second memory region 433). The first processor 410 may process data by loading the data into a first memory region 710 (e.g., the first memory region 431). In other words, the second memory region 720 may be included in the second memory region 433 for which an access right is granted to the second processor 420, and the first memory region 710 may be the first memory region 431 for which an access right is granted to the first processor 410.

According to various embodiments of the present disclosure, the first memory region 710 may be divided into a kernel region 711 and a user region 712. A portion 711a of the kernel region 711 is a shared memory region for tethering. The first processor 410 or the memory protection module 440 may permit the second processor 420 to access the portion 711a of the kernel region 711.

As shown in FIG. 7A, the second processor 420 according to various embodiments of the present disclosure may write data, received from the network 491 through the wireless communication circuit 404, in the second memory region 720. In addition, the second processor 420 may process the data written in the second memory region 720 (e.g., packetizing and NAT) and write the processed data in a buffer 711a. The data written in the buffer 711a may be written in the user region 712 by the first processor 410. The first processor 410 may transmit the data written in the user region 712 to the external device 492 through a connector (e.g., the external interface 403). According to one embodiment, the kernel region 711 and the user region 712 may be a logical memory address area used by a program. Thus, the data stored in the kernel region 711 and the data stored in the user region 712 may be the same data stored in the same physical memory address area.

As shown in FIG. 7B, the first processor 410 according to various embodiments of the present disclosure may write data, received from the external device through the connector, in the user region 712. In addition, the first processor 410 may write the data, written in the user region 712, in the buffer 711a. The second processor 420 may read data from the buffer 711a, process the read data (e.g., packetizing and NAT), and write the processed data in the second memory 720. The second processor 420 may transmit the data written in the second memory 720 to the network through the wireless communication circuit.

An electronic device according to various embodiments of the present disclosure may comprise a housing; a display exposed through a first portion of the housing; an electrical connector exposed through a second portion of the housing and including a plurality of electrical contacts; a wireless communication circuit; a first processor electrically connected to the display and the connector and configured to use a first memory address region having a first plurality of addresses; a second processor electrically connected to the wireless communication circuit and configured to use a second memory address region having a second plurality of virtual addresses; and an electric circuitry electrically connected to the first processor and the second processor and configured to provide relations between the first plurality of addresses and the second plurality of virtual addresses.

The electronic device may further comprise a dynamic random access memory (DRAM) connected between the first processor and the second processor and configured to provide a first memory region corresponding to the first memory address region and a second memory region corresponding to at least a part of the second memory address region.

The electric circuitry may include at least one of registers or buffers.

The electrical connector may include a universal serial bus (USB) connector.

The first processor may be an application processor, and the second processor may be a communication processor.

The application processor, the communication processor, and the electric circuitry may be included in an integrated circuit (IC) package or a system on chip (SoC).

The application processor may be configured to store data in a first memory region corresponding to the first memory address region through the electrical connector, and the communication processor may be configured to access the data by using the relations stored in the electric circuitry.

The communication processor may be further configured to copy, by using the relations, the data from the first memory region to a second memory region corresponding to the second memory address region.

The first processor may be further configured to register the first plurality of addresses in the electric circuitry, and such registration may include mapping the first plurality of addresses to the second plurality of virtual addresses.

The electric circuitry may be further configured to determine, based on the relations, whether to permit the second processor to access a first memory region corresponding to the first memory address region.

An electronic device according to various embodiments of the present disclosure may comprise a housing; a display exposed through a first portion of the housing; an electrical connector exposed through a second portion of the housing and including a plurality of electrical contacts; a wireless communication circuit; an application processor electrically connected to the display and the connector and configured to use a first memory address region having a first plurality of addresses; a communication processor electrically connected to the wireless communication circuit and configured to receive information about the first plurality of addresses and to access data in the first memory address region by using at least a part of the received information; and an electric circuitry electrically connected to the application processor and the communication processor and configured to permit the communication processor to access the first memory address region.

The electronic device may further comprise a dynamic random access memory (DRAM) connected to the electric circuitry and configured to provide a first memory region corresponding to the first memory address region and a second memory region corresponding to at least a part of a second memory address region.

The electrical connector may include a universal serial bus (USB) connector.

The application processor may be further configured to store data, provided through the connector, in a first memory region corresponding to the first memory address region, and the communication processor may be further configured to access the data.

FIG. 8 illustrates a flow diagram illustrating a tethering method of an electronic device in accordance with embodiments of the present disclosure. The electronic device may include all or parts of the electronic device 201 shown in FIG. 2. A processor (e.g., 210 in FIG. 2) may include, for example, an AP as a first processor (e.g., 410 in FIG. 4) for data communication with an external device, and a CP as a second processor (e.g., 420 in FIG. 4) for data communication with a network.

As shown in FIG. 8, at operation 810, the first processor 410 of the electronic device according to various embodiments may recognize the external device connected to the electronic device through an external interface (e.g., 403 in FIG. 4, or a USB connector).

At operation 820, the first processor 410 may allocate, as the buffer 431a, a part of a memory for which an access right is granted to the first processor 410. A portion of the buffer may be designated for data upload, and the other may be designated for data download.

At operation 830, the first processor 410 may grant an access right for the allocated buffer 431a to the second processor 420. For example, the first processor 410 may set the memory protection module 440 to grant the access right for the buffer 431a to the second processor 420.

At operation 840, the first processor 410 may establish relations between an address of the buffer and a virtual address. For example, the first processor 410 may register the address of the buffer in the memory protection module 440. For example, the first processor 410 may register the address of an upload region in a table of index '0', and also register the address of a download region in a table of index '1'. In addition, the first processor 410 and/or the memory protection module 440 may map a virtual address to a table corresponding to the index number.

In various embodiments of the present disclosure, the first processor 410 may notify, to the second processor 420, information about mapping relations registered in the memory protection module 440 by using, e.g., an inter process communication (IPC) technique. For example, the information of mapping relations may have a form of newly mapped index information, a form of a virtual address, or any other refined form.

Therefore, the second processor 420 according to various embodiments of the present disclosure may access the address of the buffer corresponding to the virtual address through the memory protection module, and read or write data from or to the buffer.

At operation 850, the first processor 410 may transmit tethering start information to the second processor 420 by using, e.g., the IPC technique so that the second processor 420 recognizes the start of tethering. Additionally or alternatively, the first processor 410 may transmit allocation information of the buffer to the second processor 420. The buffer allocation information may indicate that a part of the memory is allocated as a buffer. For example, the buffer allocation information may include a table index according to the establishment of relations and a virtual address accessible by the second processor 420. In various embodiments, the tethering start information and the buffer allocation information may be configured independently or in an integrated form.

At operation 860, the electronic device 401 (namely, the first processor 410 and the second processor 420) may perform tethering based on the above relations.

According to one embodiment, while tethering is performed, the first processor 410 may generate an IP address to be assigned to a host device (e.g., the external device 492) and deliver the IP address to the host device.

According to one embodiment, while tethering is performed, each processor may notify the other processor that data has been written, by using, e.g., the IPC technique, so that the other processor can read the data written in the buffer.

According to various embodiments of the disclosure, the operation 840 may be performed before the operation 830 or simultaneously with the operation 830 (namely, multiprocessing).

According to various embodiments of the present disclosure, the operation 840 may be omitted. In this case, the buffer allocation information at the operation 850 may indicate the address of the buffer 431a.

According to various embodiments of the present disclosure, after the allocation of the buffer 431a, the transmission of the tethering start information at the operation 850 may be performed before, after, or simultaneously with any other operation (e.g., the operation 830, the operation 840, or the transmission of the buffer allocation information at the operation 850).

Figure 9:
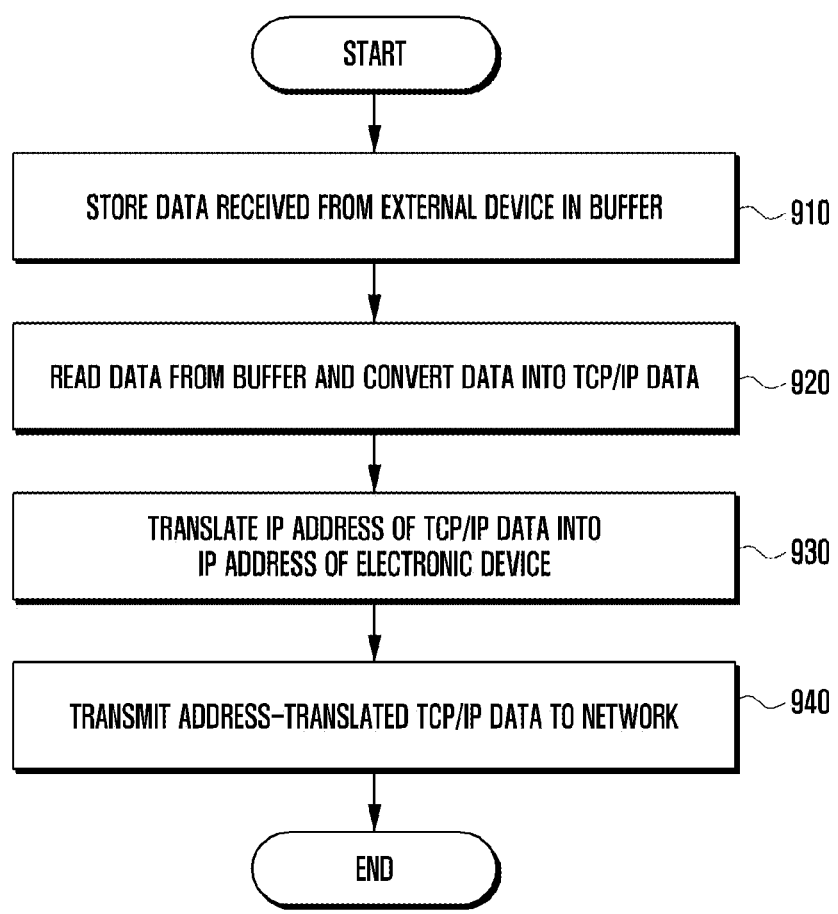
FIG. 9 illustrates a flow diagram of a data upload method in tethering of an electronic device in accordance with embodiments of the present disclosure.

FIG. 9 illustrates a flow diagram of a data upload method in tethering of an electronic device in accordance with embodiments of the present disclosure. The electronic device may include all or parts of the electronic device 201 shown in FIG. 2. A processor (e.g., 210 in FIG. 2) may include, for example, an AP as a first processor (e.g., 410 in FIG. 4) for data communication with an external device, and a CP as a second processor (e.g., 420 in FIG. 4) for data communication with a network.

As shown in FIG. 9, at operation 910, the first processor 410 may store data, received from the external device via an external interface, in a buffer (e.g., a part of a physical memory allocated as a buffer at the above-discussed operation 820 and used by the first processor 410). In addition, the first processor 410 may notify this stored data information to the second processor 420 by using, e.g., the IPC technique.

At operation 920, in response to the notification, the second processor 420 may read data from the buffer and convert (namely, packetize) the data into TCP/IP data. At operation 930, the second processor 420 may translate an IP address of the TCP/IP data into an IP address of the electronic device. At operation 940, the second processor 420 may transmit the address-translated TCP/IP data to a network through a wireless communication circuit.

Figure 10:
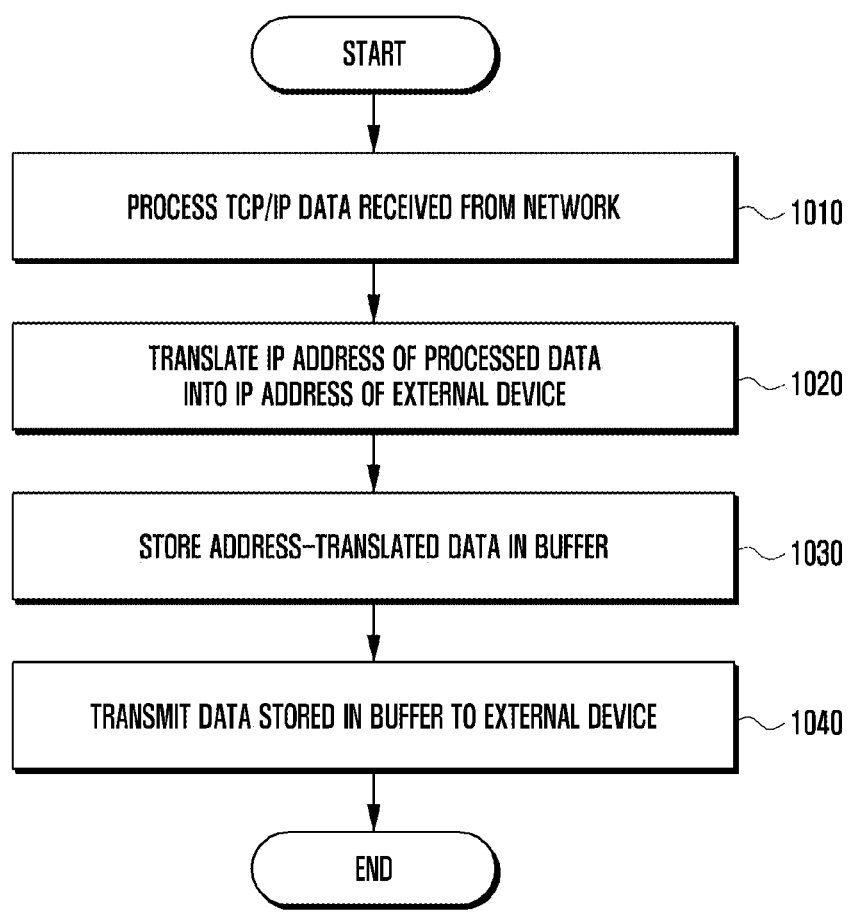
FIG. 10 illustrates a flow diagram of a data download method in tethering of an electronic device in accordance with embodiments of the present disclosure.

FIG. 10 illustrates a flow diagram of a data download method in tethering of an electronic device in accordance with embodiments of the present disclosure. The electronic device may include all or parts of the electronic device 201 shown in FIG. 2. A processor (e.g., 210 in FIG. 2) may include, for example, an AP as a first processor (e.g., 410 in FIG. 4) for data communication with an external device, and a CP as a second processor (e.g., 420 in FIG. 4) for data communication with a network.

As shown in FIG. 10, at operation 1010, the second processor 420 may process TCP/IP data (e.g., convert to USB data) received from a network through a wireless communication circuit. At operation 1020, the second processor 420 may translate an IP address of the processed data into an IP address of the external device. At operation 1030, the second processor 420 may store the address-translated data in a buffer (e.g., a part of a physical memory allocated as a buffer at the above-discussed operation 820 and used by the first processor 410). In addition, the second processor 420 may notify the completion of storage to the first processor 410. At operation 1040, in response to the notification, the first processor 410 may read data from a USB buffer and transmit it to the external device through an external interface.

Figure 11:
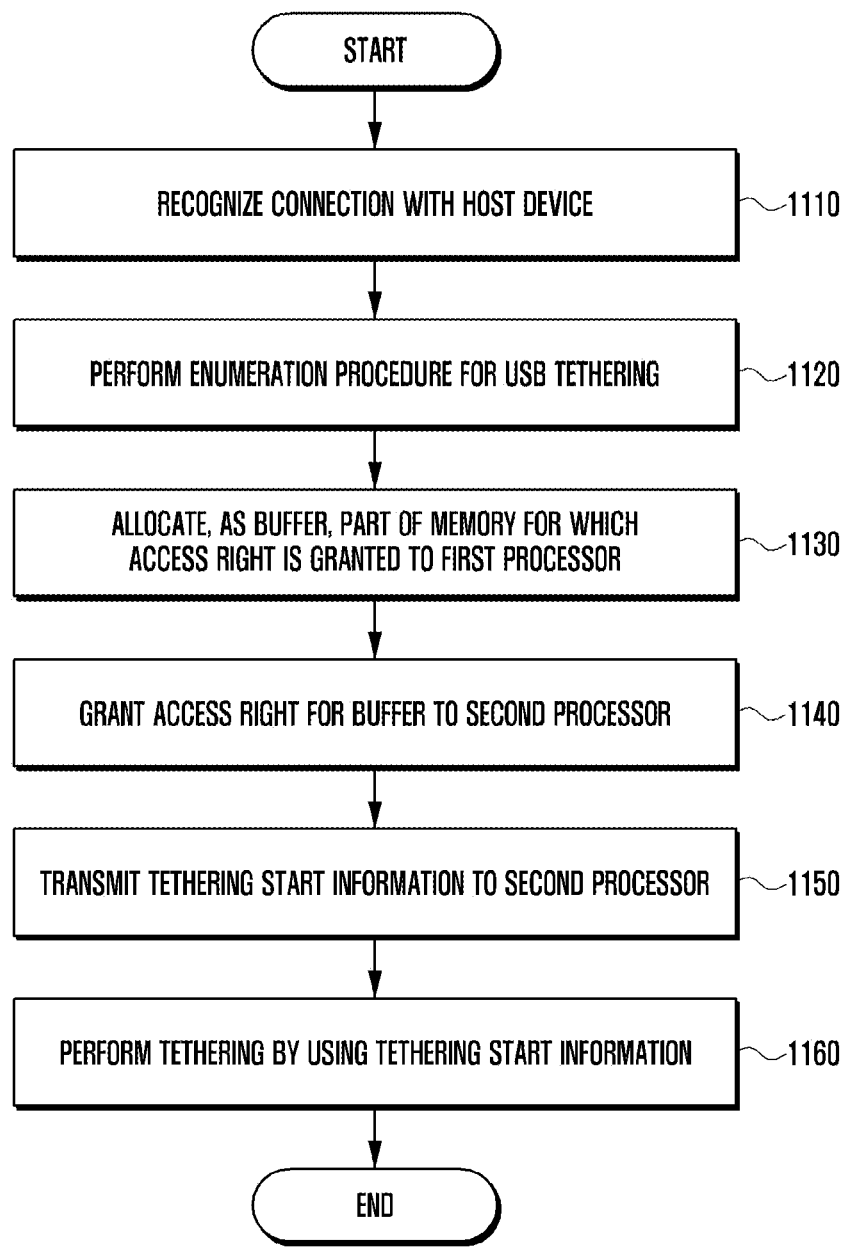
FIG. 11 illustrates a flow diagram of a tethering method of an electronic device in accordance with embodiments of the present disclosure.

FIG. 11 illustrates a flow diagram of a tethering method of an electronic device in accordance with embodiments of the present disclosure. The electronic device may include all or parts of the electronic device 201 shown in FIG. 2. A processor (e.g., 210 in FIG. 2) may include, for example, an AP as a first processor (e.g., 410 in FIG. 4) for data communication with an external device, and a CP as a second processor (e.g., 420 in FIG. 4) for data communication with a network.

As shown in FIG. 11, at operation 1110, the first processor 410 may recognize a host device connected to the electronic device through an external interface (e.g., a USB connector).

At operation 1120, the first processor 410 may perform an enumeration procedure (e.g., USB enumeration, BT enumeration, Wi-Fi enumeration) to establish a communication interface with the external device.

At operation 1130, the first processor 410 may allocate, as the buffer 431a, a part of a memory (e.g., a part designated by the memory protection module 440) for which an access right is granted to the first processor 410. A portion of the buffer may be designated for data upload, and the other may be designated for data download.

At operation 1140, the first processor 410 may grant an access right for the buffer 431a to the second processor 420.

At operation 1150, the first processor 410 may transmit tethering start information to the second processor 420 by using, e.g., the IPC technique so that the second processor 420 recognizes the start of tethering. The tethering start information may include allocation information of the buffer 431a (e.g., an address of the buffer).

At operation 1160, the first processor 410 and/or the second processor 420 may perform tethering using the tethering start information.

A tethering method of an electronic device according to various embodiments of the present disclosure may comprise an operation of allocating, as a buffer for communication with an external device, a part of a first memory region for which an access right is granted to a first processor among a plurality of processors of the electronic device, when connection between the external device and the electronic device is recognized; and an operation of permitting a second processor among the plurality of processors to access the buffer. Then, the second processor may read data written in the buffer and transmit the read data to a network, or receive data from the network and write the received data in the buffer.

The method may further comprise an operation of setting an access right of the second processor for at least a part of the first memory region for which the access right is granted to the first processor; and an operation of deleting the access right of the second processor.

The operation of setting the access right of the second processor may include an operation of providing relations between addresses of the buffer and virtual addresses accessible by the second processor.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An electronic device comprising:
a housing;
a display exposed through a first portion of the housing;
an electrical connector exposed through a second portion of the housing and including a plurality of electrical contacts;
a wireless communication circuit;
a first processor operably coupled to the display and the electrical connector and configured to use a first memory address region including a first plurality of addresses;
a second processor operably coupled to the wireless communication circuit and configured to use a second memory address region including a second plurality of virtual addresses; and
an electric circuitry operably coupled to the first processor and the second processor and configured to provide relations between the first plurality of addresses and the second plurality of virtual addresses,
wherein the first processor is further configured to register the first plurality of addresses in the electric circuitry so that the second processor accesses the first memory address region through the relations, and
wherein the registration includes mapping the first plurality of addresses to the second plurality of virtual addresses.

2. The electronic device of claim 1, further comprising:
a dynamic random access memory (DRAM) operably coupled to the first processor and the second processor and configured to provide a first memory region corresponding to the first memory address region and a second memory region corresponding to at least a part of the second memory address region.

3. The electronic device of claim 2, wherein the electric circuitry includes at least one of registers or buffers.

4. The electronic device of claim 1, wherein the electrical connector includes a universal serial bus (USB) connector.

5. The electronic device of claim 1, wherein the first processor is an application processor, and the second processor is a communication processor.

6. The electronic device of claim 5, wherein the application processor, the communication processor, and the electric circuitry are included in an integrated circuit (IC) package or a system on chip (SoC).

7. The electronic device of claim 5, wherein the application processor is further configured to store data received through the electrical connector in a first memory region corresponding to the first memory address region, and the communication processor is further configured to access the data by using the relations stored in the electric circuitry.

8. The electronic device of claim 7, wherein the communication processor is further configured to copy, by using the relations, the data from the first memory region to a second memory region corresponding to the second memory address region.

9. The electronic device of claim 1, wherein the electric circuitry is further configured to determine, based on the relations, whether the second processor has an access right to access the first memory address region.

10. An electronic device comprising:
a housing;
a display exposed through a first portion of the housing;
an electrical connector exposed through a second portion of the housing and including a plurality of electrical contacts;
a wireless communication circuit;
an application processor operably coupled to the display and the electrical connector and configured to use a first memory address region including a first plurality of addresses;
a communication processor operably coupled to the wireless communication circuit and configured to receive information about the first plurality of addresses and to access data in the first memory address region by using at least a part of the received information; and
an electric circuitry operably coupled to the application processor and the communication processor and configured to permit the communication processor to access the first memory address region,
wherein the communication processor is further configured to use a second memory address region including a second plurality of virtual addresses,
wherein the application processor is further configured to register the first plurality of addresses in the electric circuitry so that the communication processor accesses the first memory address region through the electric circuitry, and
wherein the registration includes mapping the first plurality of addresses to the second plurality of virtual addresses.

11. The electronic device of claim 10, further comprising:
a dynamic random access memory (DRAM) operably coupled to the electric circuitry and configured to provide a first memory region corresponding to the first memory address region and a second memory region corresponding to at least a part of the second memory address region.

12. The electronic device of claim 11, wherein the electrical connector includes a universal serial bus (USB) connector.

13. The electronic device of claim 10, wherein the application processor is further configured to store data, provided through the electrical connector, in the first memory address region, and the communication processor is further configured to access the data.

14. The electronic device of claim 13, wherein the communication processor is further configured to copy the data from the first memory address region to a second memory region corresponding to the second memory address region.

15. The electronic device of claim 10, wherein the electric circuitry is further configured to determine whether to permit the communication processor to access the first memory address region.

16. A tethering method of an electronic device, the method comprising:
allocating by a first processor among a plurality of processors of the electronic device, as a buffer for communication with an external device, a part of a first memory region, for which an access right is granted to the first processor devise, based on a connection between the external device and the electronic device being recognized; and
permitting a second processor among the plurality of processors to access the buffer, wherein the first processor writes data received from the external device in the buffer, and wherein the second processor reads the data written in the buffer by the first processor and transmits the read data to a network, or receives data from the network and writes the received data in the buffer.

17. The method of claim 16, further comprising:

setting an access right of the second processor for at least a part of the first memory region that the access right is granted to the first processor; and deleting the access right of the second processor.

18. The method of claim 17, wherein the setting the access right of the second processor includes providing relations between addresses of the buffer and virtual addresses accessible by the second processor.

* * * * *